UNITED STATES PATENT OFFICE.

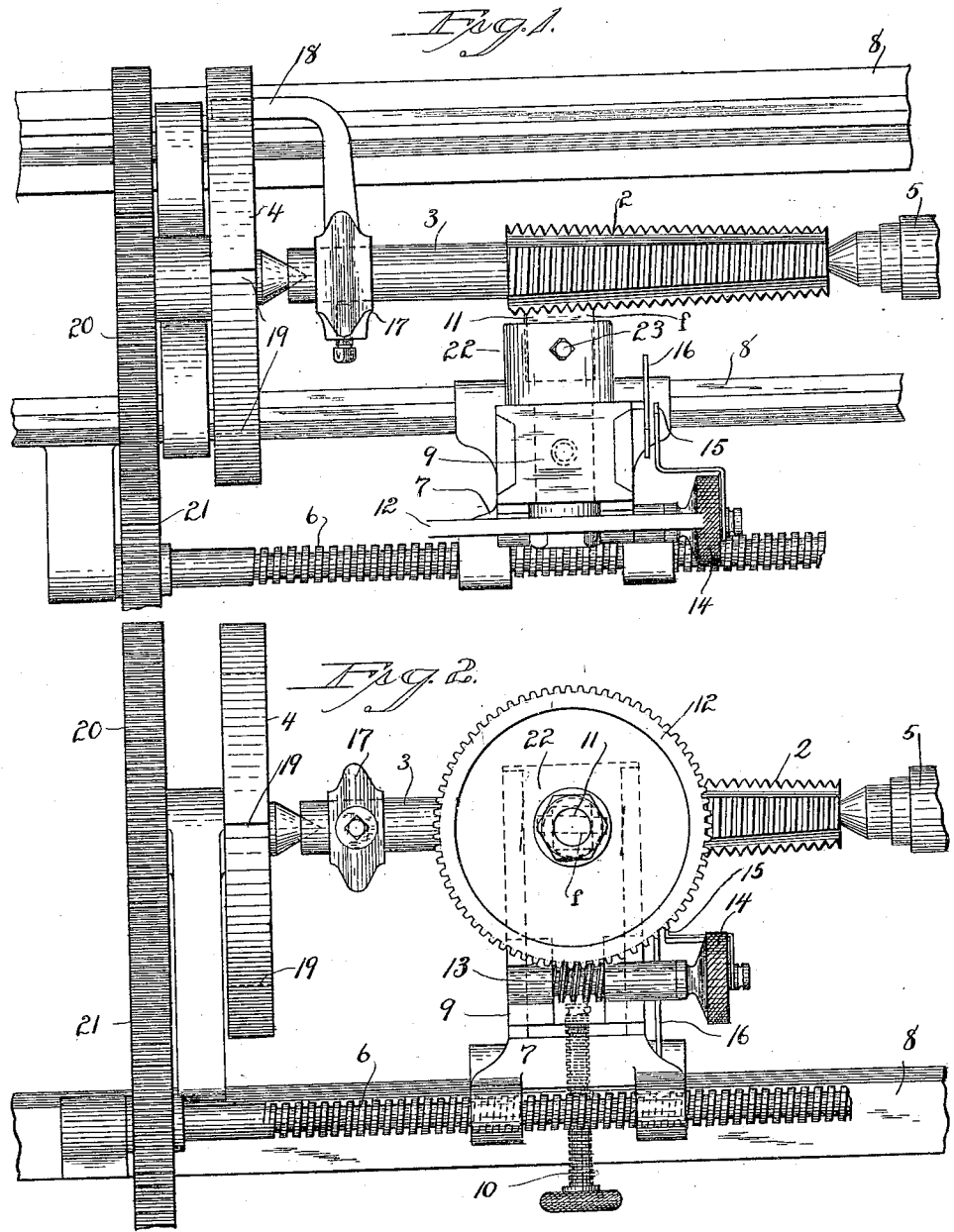

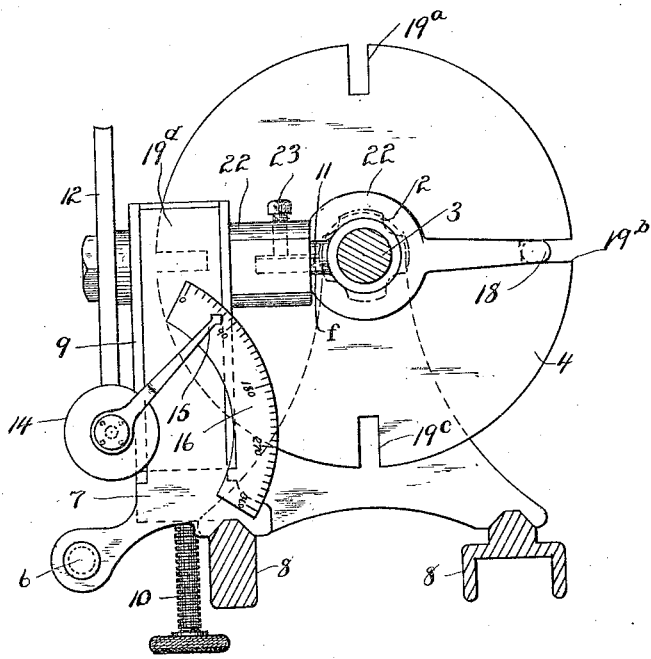

WILBUR A. LEONARD, OF NEW HAVEN, CONNECTICUT.

MEANS FOR CUTTING THREADING-DIES.

1,137,408.  Specification of Letters Patent.  Patented Apr. 27, 1915.

Application filed September 14, 1914. Serial No. 861,613.

*To all whom it may concern:*

Be it known that I, WILBUR A. LEONARD, a citizen of the United States, residing at New Haven, in the county of New Haven and State of Connecticut, have invented a new and useful Improvement in Means for Cutting Threading-Dies; and I do hereby declare the following, when taken in connection with the accompanying drawings and the characters of reference marked thereon, to be a full, clear, and exact description of the same, and which said drawings constitute part of this application, and represent, in—

Figure 1 a top or plan view of a mechanism for threading dies embodying my invention. Fig. 2 a face view of the same. Fig. 3 a view in end elevation. Fig. 4 a diagrammatical view illustrating the relative position of a cutting tool with relation to the die and the probable maximum size and relative relation of the stock to be cut by the finished die. Fig. 5 a face view of one set of finished dies. Figs. 6, 7, 8 and 9 are side views of a set of four cutting dies showing the relative position of the cutting threads.

This invention relates to an improvement in means for cutting threading dies such as are commonly used in sets in connection with a die head, or with an ordinary Armstrong die stock for threading pipes, rods and other articles. In the usual method of milling these dies for sets careful computation must be made in order to insure the continuity of the cutting surfaces in the several dies of a set, these dies usually being used in sets of four, but also in sets of three and six.

This invention relates particularly to tap dies as distinguished from so called milled dies; and the object of the invention is to provide simple means whereby the dies may be cut with perfect accuracy and without requiring any computation other than that shown by the means themselves; and the invention consists in the method and means hereinafter described and particularly recited in the claims.

In carrying out my invention I employ a tap cutter 2 formed with a spindle 3 which may be mounted between the head 4 and the tail block 5 of an ordinary lathe. Parallel with the tap cutter 2 is a screw feed 6 on which is mounted a carriage 7 which also has a bearing on the bed 8 of the lathe. Vertically movable in the carriage is a block 9 adjustable vertically by a set screw 10, and this block carries a die-holder 22 in which a die-blank 11 may be held. The shank of the holder extends through the block, and fixed to the outer end is a worm wheel 12 meshing with a worm screw 13 by which the holder may be turned so as to incline the blank as required to give the proper presentation to the tap cutter. On this screw is a knurled handle 14 by which the worm screw may be turned, and on this handle is a pointer 15 sweeping the dial 16 for the purpose as will be hereinafter explained.

Fixed on the shank 3 is a dog 17 the tail 18 of which is adapted to enter recesses or notches 19 in the head 4, the number of notches corresponding to the number of dies in a set, these notches being spaced equidistant. Moving with the head 4 is a gear 20 meshing with a pinion 21 on the feed screw 6, so that the feed screw moves in time with the movement of the tap-cutter. Assuming that the tap cutter is a one inch cutter, with ten threads to the inch, and the blank to be cut is for a half inch 10 thread,— the blank is placed in the holder 22 where it may be held by a screw 23. The angle of the thread of the tap will be 2°—0′; the angle of the thread on the die will be 4°—24′. As the inclination of the tap cutter cannot be changed, it is necessary to incline the blank 2°—24′, which in addition to the inclination of the thread on the tap cutter, will give the necessary angle of 4°—24′. This is indicated by the pointer 15 on the dial 16. The tail of the dog engaging with the notch 19ª, and the mechanism set in motion, it follows that the blank will be moved by the carriage in direct relation to the movement of the tap-cutter as they are interlocked by the gear mechanism. The blank to be cut is therefore moved not only by the threads on the tap-cutter, but by the feed screw 6, which corrects any inaccuracies in the threads on the tap cutter. The machine is run back to bring the carriage to a starting point, the cut die *f* removed and a second blank *g* inserted. The tail 18 of the dog will be moved out of the notch *a* and entered into the notch *b* which gives the cutter a turn of a quarter of a revolution in advance of the previous operation, so that when the blank *g* approaches the tap cutter, the threads will commence a quarter of a turn in advance of the previously cut die, or a quarter of the width of a tooth in advance of the previously cut die. When this blank *g* is cut, a third blank *h* will be inserted; the tail of the dog entered into a notch *c*, and the operation repeated so that the cutting of the third blank will begin half a tooth in advance of the first die. When this third die is cut, a fourth die *i* will be placed in the holder and the tail of the dog inserted in the notch *d* which will start the cutting three-quarters of the width of a tooth in advance of the first cut die. It is immaterial in cutting a set of four dies which notch in the head of the dog first engages as they must follow in sequence, and the head may be turned in either direction.

It will be apparent from the foregoing that to cut a set of six dies a head would be provided with six notches equi-distantly spaced, and this head for six cutters might be used for cutting a set of three.

In cutting the dies it is desirable that the first point of contact should do the cutting. It is therefore necessary in cutting a die that it should have a relative inclination different from the diameter of the tap cutter; or in other words, the tap cutter must be larger in diameter than the maximum size of blank to be cut; and by providing for tilting the blank holder, the variations between the fixed inclination of the threads on the tap cutter and those desired on the various dimensions of sets to be cut, are compensated for by tilting the blank holder. I am thus enabled with a single tap cutter, as for instance, one of 1 inch diameter, to cut dies for various dimensions less than 1 inch.

I claim:—

1. The combination with a tap cutter and means for driving the same, of a die-blank holder and means for moving the same in time with the tap cutter, and means for rocking the blank holder with relation to the cutter whereby the dies of a set produced will cut threads of a greater angle than the angle of the tap cutter.

2. The combination with a tap cutter and means for driving the same, a feed screw parallel with the tap cutter, a carriage on said feed screw and movable thereon, a blank holder mounted in said carriage, and means for advancing and holding the tap cutter, a space in advance of the previous position corresponding to the number of dies in a set.

3. The combination with a tap cutter, of means for supporting the same and for rotating it, a feed screw parallel with the tap cutter, a carriage on said feed screw, an adjustable block in said carriage, a blank holder in said block, means for rocking the said block, and connection between the driving means for the cutter and driving means for the feed screw whereby the blank may be moved in predetermined relation to the cutter, and a dog connected with said tap cutter and adjustably engaged with the means for driving the same.

4. The combination with a tap cutter, of means for supporting the same and for rotating the die, a feed screw parallel with the cutter, a carriage on said feed screw, an adjustable block on said carriage, a blank holder and means for rocking the said block, connections between the driving means for the feed screw whereby the blank may be moved in predetermined relation to the cutter, and means for advancing and holding the tap cutter a space in advance of the previous position corresponding to the number of dies in a set.

5. The combination with a tap cutter, of a head with which the cutter is centrally engaged, said head formed with a series of notches, a feed screw parallel with the tap cutter, a carriage on said feed screw, a blank holder movable with said carriage, and a dog fixed to the tap cutter and adapted to engage with said head whereby the tap cutter may be adjusted relatively to the position of the blank holder whereby the beginning of the cutter operation of a series of blanks will be relatively advanced.

In testimony whereof, I have signed this specification in the presence of two subscribing witnesses.

WILBUR A. LEONARD.

Witnesses:
 FREDERIC C. EARLE,
 CLARA L. WEED.

Copies of this patent may be obtained for five cents each, by addressing the "Commissioner of Patents, Washington, D. C."